United States Patent [19]

Pease et al.

[11] Patent Number: 5,340,519
[45] Date of Patent: Aug. 23, 1994

[54] PREPARATION OF POLY(M-PHENYLENE ISOPHTHALAMIDE) FILAMENTS

[75] Inventors: Richard A. Pease, Bear, Del.; David J. Rodini, Midlothian, Va.

[73] Assignee: E. I. Du Pont de Nemours and Company, Wilmington, Del.

[21] Appl. No.: 39,564

[22] Filed: Mar. 29, 1993

[51] Int. Cl.⁵ .................. B01J 43/00; D01F 6/60
[52] U.S. Cl. .................... 264/169; 210/263; 210/503; 210/660; 210/685; 264/184; 264/205
[58] Field of Search ............ 264/169, 184, 205; 210/263, 503, 660, 685

[56] References Cited

FOREIGN PATENT DOCUMENTS 246634  5/1987  European Pat. Off. .

OTHER PUBLICATIONS

Technical Bulletin–Amberlyst ® A–21, Rohm & Haas (Undated).
Translation of Japan 53-15,110 (Published May 22, 1978).

*Primary Examiner*—Leo B. Tentoni

[57] ABSTRACT

In the preparation of poly(m-phenylene isophthalamide) filaments, hydrogen chloride is removed from as-produced amide solution of poly(m-phenylene isophthalamide) by contact with basic ion exchange resin.

6 Claims, No Drawings

PREPARATION OF POLY(M-PHENYLENE ISOPHTHALAMIDE) FILAMENTS

BACKGROUND OF THE INVENTION

In a standard procedure for preparing filaments of poly(m-phenylene isophthalamide)(MPD-I), isophthaloyl chloride (ICl) is condensed with m-phenylene diamine (MPD) in dimethylacetamide (DMAc) as solvent. Hydrogen chloride (HCl) is a by-product. The HCl is ordinarily neutralized with lime since it is highly corrosive. The salt which forms, calcium chloride, must ultimately be removed and disposed of. Presence of the salt in the solution limits the solubility of the MPD-I and hinders removal of the solvent during the spinning process. This all works against obtaining high solids MPD-I solutions which are desirable for spinning processes.

SUMMARY OF THE INVENTION

The present invention provides a process for preparing poly(m-phenylene isophthalamide) filaments comprising:

a) reacting m-phenylene diamine with isophthaloyl chloride in an amide solvent to produce poly(m-phenylene isophthalamide) in an HCl-containing amide solution;

b) passing the polymer solution through a bed of ion exchange resin in base form to remove HCl and collecting an amide solution of the polymer as effluent;

c) removing amide solvent from the effluent as necessary to attain suitable viscosity and concentration of the solution for spinning; and d) spinning the solution to form filaments.

Also provided is a substantially HCl-free, clear spinning solution consisting of at least 18% by weight of poly(m-phenylene isophthalamide) in dimethylacetamide.

DETAILED DESCRIPTION OF THE INVENTION

This invention offers a novel process for preparing MPD-I filaments.

As is known in the art, MPD-I is made by reacting MPD with ICl in an amide solvent such as DMAc. If desired, minor amounts, generally less than 10%, of p-phenylene diamine and/or terephthaloyl chloride may be included in the reaction mixture to form copolymers with slightly different solubility, melting point, etc. provided their presence does not adversely interfere with the normal preparation of polymer and manufacture of filaments. Other amide solvents such as dimethylformamide (DMF) and N-methylpyrrolidone (NMP) may also be useful.

Suitable conditions for reacting the diamine and diacyl chloride are well-known to those skilled in the art. The reaction produces a solution of MPD-I in the amide solvent. Also present is HCl formed as an undesirable byproduct. In the prior art processes, the HCl has been neutralized with lime to minimize corrosion. The high concentration of calcium chloride produced by the neutralization limits the solubility of the polymer and hinders removal of the solvent during the spinning process.

In accordance with the present invention, the HCl is removed by passing the as-produced solution of the polymerization through a bed of basic ion exchange resin. It may be desirable to first add more amide solvent to the solution to reduce viscosity before contact with the ion exchange resin, so that it can pass through the ion exchange column more efficiently. Useful ion exchange resins for this purpose are commercially available. They react with strong mineral acids to form amine salts of the acid. Preferably the resin is weakly basic. One such resin having tertiary amine functional groups is AMBERLYST® ion exchange resin A-21 available from Rohm and Haas Company of Philadelphia, Pa.

The concentration and viscosity of the HCl-free effluent from the ion exchanger is normally adjusted as desired for preparing a spin dope. Ordinarily, a portion of the amide solvent is removed by evaporation under reduced pressure to increase solids concentration in the dope or to adjust viscosity for spinning. This process permits the production of clear high concentration, i.e., 18% by wt. of polymer in amide solvent, and above. Efforts to prepare a similar solution by other techniques have been found to result in cloudy mixtures that are not suitable for spinning.

Finally, the dope is dry spun or wet spun by techniques well-known in the art. Thus, in dry spinning, the dope is extruded through a spinneret into a hot gaseous atmosphere that removes a portion of the solvent and then the solvent depleted filaments are quench coagulated in an aqueous medium that removes further amounts of solvent. This is commonly followed by extraction-drawing in which the filaments are drawn and washed to remove residual solvent.

In a wet-spinning process, the extruded filaments pass directly into an aqueous quench coagulation bath and the solvent depleted filaments are extraction-drawn as before.

Variations of the above described process may be employed. For example, the solution resulting from the polymerization may be divided and a major portion thereof processed as described above to remove HCl and the remainder combined with the HCl-free solution. The combined solution can be neutralized with lime and a spin dope prepared by adjusting solvent content to attain suitable viscosity and concentration for spinning. Since the combined solution contains a relatively small amount of HCl, most having been removed upon passage through the ion exchange resin column, only a small amount of lime will be needed to effect neutralization. Similarly, the small amount of calcium chloride which is formed will interfere less with solvent removal in the spinning process and will present less of a disposal problem.

Still another procedure that is useful employs the polymer-forming reactants in less than equivalent proportions. For example, a stoichiometric excess of diamine will produce low molecular weight polymer having an excess of amine ends. Because of the low molecular weight of the polymer, the solution viscosity will be low and it can be passed through the ion exchange column very efficiently. The effluent can then be combined with additional ICl to form high molecular weight polymer in a solution that contains less HCl than it would have had equivalent quantities of MPD and ICl been used initially. The solution containing a reduced amount of HCl can then be processed as described above.

The following examples are illustrative of the present invention.

EXAMPLES

Example 1

A jacketed flask, with an inlet port on the top and an outlet port on the bottom, which is approximately 10.2 cm in diameter and 30 cm in height is filled to a height of 21 cm with weakly basic A-21 ion exchange resin. The resin is conditioned by pumping the following solutions through ion exchange resin: two bed volumes of 1.5N aqueous sodium hydroxide followed by a water wash until the effluent is neutral, and then two bed volumes of 2N HCl, followed by water rinsing until the effluent is neutral. Next the resin in the column is treated with two bed volumes of 1.5N aqueous sodium hydroxide and rinsed with water until the column effluent is neutral. Water is removed from the column by rinsing the resin with 5 bed volumes of anhydrous DMAc.

To a jacketed 3 L three-necked flask is added approximately 1000 grams of a 13% polymer solids solution of poly(m-phenylene isophthalamide) in DMAc containing 4% HCl. The solution is obtained by reacting ICl with MPD in DMAc. This flask serves as the reservoir for the acid polymer. The jacketed flask containing polymer and the jacketed flask containing the resin are heated using a circulation water bath of 70° C. The polymer solution is stirred and pumped into the top port of the resin containing flask at a rate of approximately 14 g/min. The eluent of the flask containing resin is collected at the outlet port of the flask and tested periodically for polymer (by sampling and testing for polymer via precipitation). Once polymer is detected, the effluent is collected in a separate container. Polymer is collected until very little polymer is detected in the effluent. The collected material is a solution of poly(m-phenylene isophthalamide) in DMAc. Some dilution of the polymer with DMAc occurs so that the final solids content of the acid free polymer solution is approximately 5% MPD-I in DMAc.

Example 2

To a jacketed 3 liter three-necked flask is added approximately 800 grams of MPD-I pre-polymer (80% of stoichiometric ICl added) consisting of approximately 17% polymer solids in DMAc containing 5% HCl. The jacketed flask containing polymer and the jacketed flask containing the resin prepared as in Example 1, are heated using a circulating water bath of 70° C. The pre-polymer solution is stirred and pumped into the inlet port of the resin containing flask at a rate of approximately 14 g/min. The eluent of the flask from the outlet port of the flask is tested periodically for polymer (by sampling and testing for polymer via precipitation). Once polymer is detected, the effluent is collected in a separate container. Polymer is collected until very little polymer is detected in the effluent. The collected material is a solution of low molecular weight MPD-I in DMAc. The solids of the solution are determined by evaporation to be 13.21%.

Example 3

To a dry 500 ml resin kettle fitted with a mechanical stirrer, and a nitrogen purge are added 192.7 g of prepolymer solution as prepared in Example 2. The solution is stirred and cooled using an ice bath and 4.8 g of molten isophthaloyl chloride (ICl) are added. The ice bath is removed and the solution is stirred at room temperature for 30 minutes. Next, 2 grams of calcium hydroxide are added and the solution is stirred for an additional 30 minutes. The polymer solution is then added to a blender containing a mixture of water and ice. The polymer is precipitated, filtered and washed with water until the water washes are neutral. The polymer is thoroughly dried. The inherent viscosity at 25° C. is 0.57.

Example 4

Concentration of Polymer solution

Polymer effluent from Example 1 is concentrated via vacuum distillation of DMAc as follows: 1000 ml of 5% solids salt free MPD-I polymer in DMAc is added to a 2000 ml single neck pear shaped flask. This flask is connected to a rotary evaporator apparatus. A vacuum of approximately 28 inches water is pulled on the apparatus and the flask is rotated at the rate of approximately 200 rpm. The rotating flask is then heated via a water bath of 70° C. DMAc is removed until the total weight of the polymer and DMAc in the flask is 208 grams. This corresponds to a 24% MPD-I polymer solids in DMAc.

Example 5

Wet Spinning

A salt-free solution consisting of 24% MPD-I in DMAc was extruded through a 50 hole, 5 mil per hole, spinneret submerged in a coagulation medium. The coagulating medium consisted of DMAc/$CaCl_2$/Water in a 10/36/54 by weight ratio. The coagulation medium was contained in an 8' long bath. The jet velocity of the spinning solution through the spinneret was 13.6 FPM (ft/min), with a wind-up speed of 40 FPM. The fiber was washed with water and drawn approximately 4X across a not bar to give 2.1 dpf fiber with T/E/M=5.5 gpd/32%/94 gpd.

We claim:

1. A process for preparing poly(m-phenylene isophthalamide) filaments comprising:
   a) reacting m-phenylene diamine with isophthaloyl chloride in an amide solvent to produce poly(m-phenylene isophthalamide) in an HCl-containing amide solution;
   b) passing the polymer solution through a bed of ion exchange resin in base form to remove HCl and collecting an amide solution of the polymer as effluent;
   c) removing amide solvent from the effluent as necessary to attain suitable viscosity and concentration of the solution for spinning; and
   d) spinning the solution to form filaments.

2. A process according to claim 1 wherein the amide solvent is dimethyl acetamide.

3. A process according to claim 1 wherein the ion exchange resin has tertiary amine functional groups.

4. A process for preparing poly(m-phenylene isophthalamide) filaments comprising:
   a) reacting m-phenylene diamine with isophthaloyl chloride in an amide solvent to produce poly(m-phenylene isophthalamide) in an HCl-containing amide solution;
   b) passing a major portion of the polymer solution through a bed of ion exchange resin in base form to remove HCl and combining the HCl-free effluent of polymer in amide solvent with the remaining HCl-containing polymer solution;

c) neutralizing the HCl of the combined solutions by addition of lime;
d) removing solvent as necessary to attain suitable viscosity and concentration of the solution for spinning; and
e) spinning the solution to form filaments.

5. A process for preparing poly(m-phenylene isophthalamide) filaments comprising;
   a) reacting in an amide solvent, isophthaloyl chloride with a stoichiometric excess of m-phenylene diamine to produce an HCl-containing solution of low molecular weight polymer having an excess of amine ends;
   b) passing the polymer solution through a bed of ion exchange resin in base form to remove HCl and recovering the HCl-free effluent of polymer in amide solvent;
   c) adding isophthaloyl chloride to the effluent to form high molecular weight polymer and by-product HCl;
   d) neutralizing the HCl by addition of
   e) removing solvent as necessary to attain suitable viscosity and concentration of the solution for spinning; and
   f) spinning the solution to form filaments.

6. A method of removing HCl from a solution of poly(m-phenylene isophthalamide) in an HCl-containing amide solvent, comprising passing the solution through a bed of ion exchange resin in base form and recovering the HCl-free amide solution of the polymer.

* * * * *

UNITED STATES PATENT AND TRADEMARK OFFICE
CERTIFICATE OF CORRECTION

PATENT NO. : 5,340,519
DATED : August 23, 1994
INVENTOR(S) : Richard A. Pease and David J. Rodini It is certified that error appears in the above-identified patent and that said Letters Patent is hereby corrected as shown below:

Column 6, line 6, after "addition of" add the word -- lime; --

Signed and Sealed this

Eighth Day of November, 1994

Attest:

BRUCE LEHMAN

Attesting Officer

Commissioner of Patents and Trademarks